United States Patent
Sinha et al.

(10) Patent No.: US 7,544,430 B2
(45) Date of Patent: Jun. 9, 2009

(54) ONLINE DETECTION OF STACK CROSSOVER RATE FOR ADAPTIVE HYDROGEN BLEED STRATEGY

(75) Inventors: Manish Sinha, Pittsford, NY (US); Prasad Gade, Webster, NY (US); Daniel Difiore, Geneseo, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 357 days.

(21) Appl. No.: 11/640,073

(22) Filed: Dec. 15, 2006

(65) Prior Publication Data

US 2008/0145720 A1 Jun. 19, 2008

(51) Int. Cl.
*H01M 8/04* (2006.01)
(52) U.S. Cl. ............... 429/13; 429/23; 429/34
(58) Field of Classification Search ........ None
See application file for complete search history.

(56) References Cited

U.S. PATENT DOCUMENTS

2006/0068243 A1* 3/2006 Lienkamp .............. 429/13
2007/0231636 A1* 10/2007 Alp et al. ............... 429/22

* cited by examiner

*Primary Examiner*—John S Maples

(57) ABSTRACT

A system and method for determining when to provide an anode exhaust gas bleed from a fuel cell stack as the fuel cell stack ages. The method determines the amount of nitrogen flowing from a cathode side to an anode side of the fuel cell stack. The method also determines the amount of nitrogen flowing from the anode side to the cathode side by determining a standard deviation of voltage outputs of the fuel cells, and using the standard deviation as a model for determining the leak rate of nitrogen from the anode side to the cathode side. The method determines the concentration of nitrogen in the anode side based on the nitrogen flow between the cathode and anode side, and opens a bleed valve to bleed the anode exhaust gas if the concentration of nitrogen in the anode side goes above a predetermined value.

18 Claims, 2 Drawing Sheets

US 7,544,430 B2

ONLINE DETECTION OF STACK CROSSOVER RATE FOR ADAPTIVE HYDROGEN BLEED STRATEGY

BACKGROUND OF THE INVENTION

1. Field of the Invention

This invention relates generally to a process for determining when to perform an anode exhaust gas bleed to remove nitrogen from the anode side of a fuel cell stack and, more particularly, to a process for determining when to perform an anode exhaust gas bleed to remove nitrogen from the anode side of a fuel cell stack that considers a leak rate from the anode side to the cathode side through cell membranes as a result of pin holes therein.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be higher than the cathode side pressure, the cathode side partial pressures will cause air to permeate through the membrane. Nitrogen in the anode side of the fuel cell stack dilutes the hydrogen such that if the nitrogen concentration increases beyond a certain percentage, such as 50%, the fuel cell stack becomes unstable and may fail. It is known in the art to provide a bleed valve at the anode exhaust gas output of the fuel cell stack to remove nitrogen from the anode side of the stack.

An algorithm is typically employed to provide an online estimation of the nitrogen concentration in the anode exhaust gas during stack operation to know when to trigger the anode exhaust gas bleed. The algorithm tracks the nitrogen concentration over time in the anode side of the stack based on the permeation rate from the cathode side to the anode side, and the periodic bleeds of the anode exhaust gas. When the algorithm calculates an increase in the nitrogen concentration above a predetermined threshold, for example, 10%, it would trigger the bleed. The bleed is performed for a duration that allows multiple stack anode volumes to be bled, thus reducing the nitrogen concentration below the threshold.

The known anode exhaust gas bleed strategies do not consider changes in the permeation rate of the membrane over the life of the stack. Particularly, as is well understood in the art, the MEAs will continuously develop pinholes as the stack ages as a result of the electro-chemical reaction that increases the permeation rate between the anode side and the cathode side. Because the anode side is typically kept at a higher absolute pressure than the cathode side, the rate of nitrogen accumulation in the anode side will actually decrease over time, requiring less anode exhaust gas bleeds or less anode exhaust gas bleed durations. Particularly, the nitrogen will flow back from the anode side to the cathode side by convective flow through the pinholes.

SUMMARY OF THE INVENTION

In accordance with the teachings of the present invention, a system and method are disclosed for determining when to provide an anode exhaust gas bleed from a fuel cell stack as the fuel cell stack ages. The method determines the amount of nitrogen flowing from a cathode side of the fuel cell stack to an anode side of the fuel cell stack. The method also determines the amount of nitrogen flowing from the anode side of the fuel cell stack to the cathode side of the fuel cell stack by determining a standard deviation of voltage outputs of fuel cells in the fuel cell stack, and using the standard deviation as a model for determining the leak rate of nitrogen from the anode side to the cathode side of the fuel cell stack. The leak rate is then converted to the flow of nitrogen from the anode side to the cathode side. The method determines the concentration of nitrogen in the anode side of the fuel cell stack based on the nitrogen flow between the cathode and anode sides of the fuel cell stack, and opens a bleed valve to bleed the anode exhaust gas if the concentration of nitrogen in the anode side of the fuel cell stack goes above a predetermined value.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a process for determining when to provide an anode exhaust gas bleed in a fuel cell system over the life of a fuel cell stack is merely exemplary in nature, and is in no way intended to limit the invention or its applications or uses.

Figure 1:
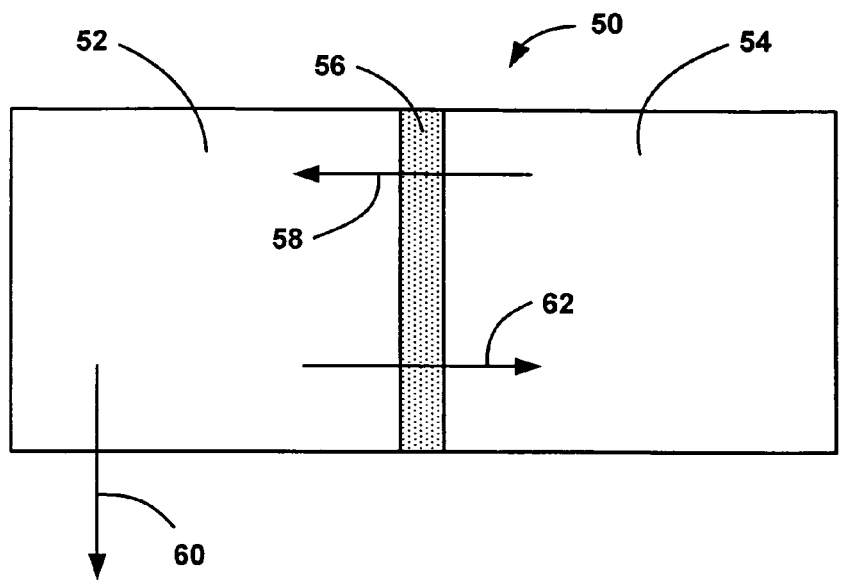
FIG. 1 is a plan view of a fuel cell showing nitrogen permeation from the cathode side to the anode side of the fuel cell, nitrogen permeation from the anode side to the cathode side of the fuel cell and a nitrogen bleed from the anode side of the fuel cell.

FIG. 1 is a representation of a fuel cell 50 including an anode side 52, a cathode side 54 and a membrane 56 therebetween. Line 58 represents the nitrogen cross-over flow from the cathode side 54 to the anode side 52, line 60 represents the flow from the anode side 52 during an anode exhaust gas bleed and line 62 represents the permeation of the nitrogen from the anode side 52 through pinholes in the membrane 56. Because the internal permeation is through pinholes in the membrane, the flow of nitrogen from the anode side 52 to the cathode side 54 when the stack 50 is new is very low, and thus the anode exhaust gas bleed model typically does not consider this permeation to determine when to provide the anode exhaust gas bleed. Because the anode exhaust gas bleed model does not consider this permeation, it will trigger the anode exhaust gas bleeds before they are necessary as the stack ages, thus reducing fuel efficiency.

The leak rate of the membrane could be determined offline during vehicle service, and the anode exhaust bleed model could be updated. However, it would be more desirable to have an online technique that continually adapted the bleed control strategy as the fuel cell stack aged.

Figure 2:
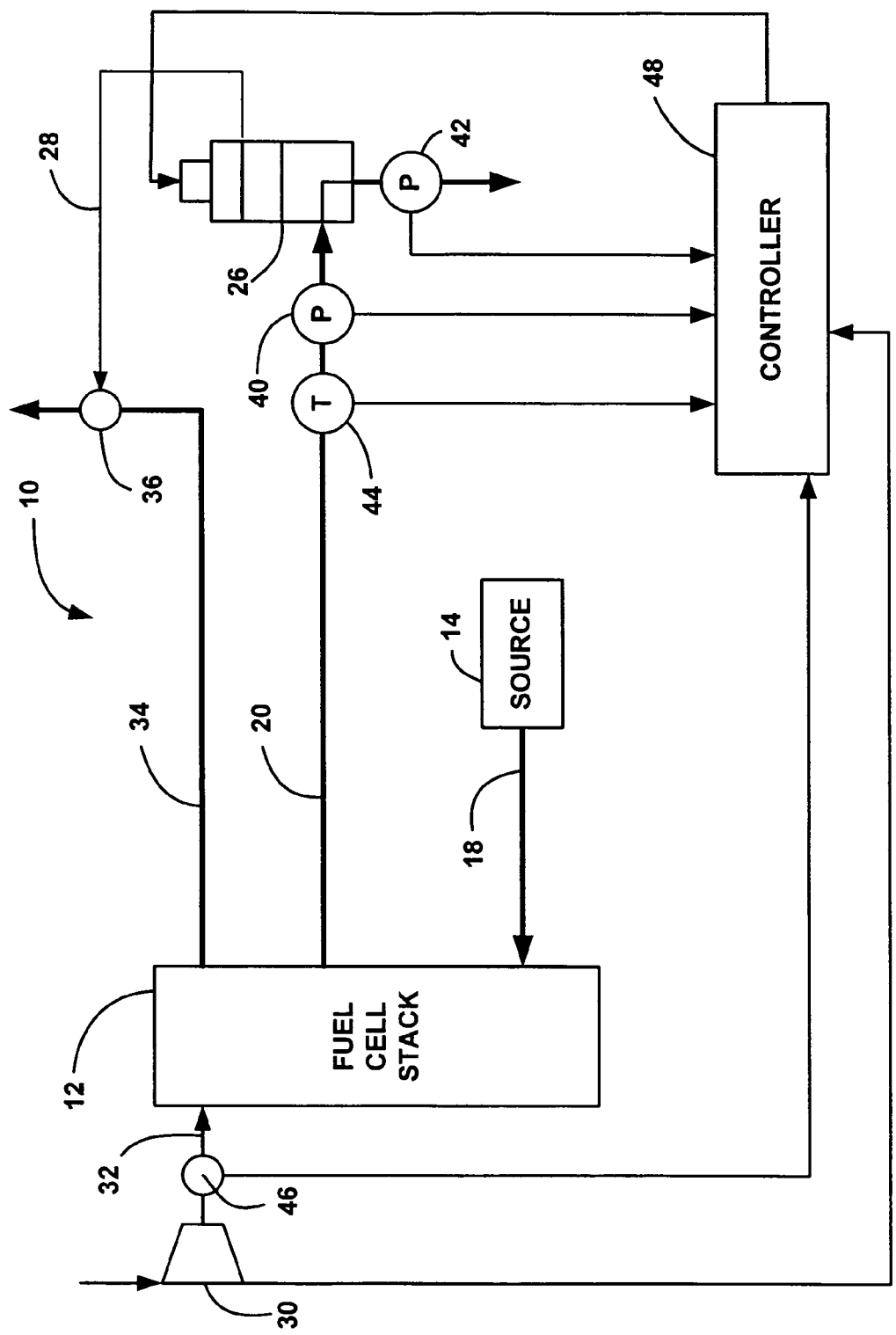
FIG. 2 is a schematic plan view of a fuel cell system including a bleed valve for bleeding an anode exhaust gas from a fuel cell stack.

FIG. 2 is a schematic block diagram of a fuel cell system 10 including a fuel cell stack 12. The fuel cell system 10 is intended to generally represent any type of fuel cell system that requires an anode exhaust gas bleed to remove nitrogen from the anode side of the stack 12, such as fuel cell systems that recirculate the anode exhaust gas back to the anode inlet and fuel cell systems that employ a split stack design with anode flow shifting. Hydrogen gas from a hydrogen source 14 is provided to the anode side of the fuel cell stack 12 on line 18. Air from a compressor 30 is provided to the cathode side of the fuel cell stack 12 on line 32. An anode exhaust gas is output from the fuel cell stack 12 on line 20 and is sent to a bleed valve 26. A cathode exhaust gas is output from the fuel cell stack 12 on cathode exhaust gas line 34.

As discussed above, nitrogen cross-over from the cathode side of the fuel cell stack 12 dilutes the hydrogen in the anode side that affects stack performance. Therefore, it is necessary to periodically bleed the anode exhaust gas to reduce the amount of nitrogen in the anode sub-system. When the bleed valve 26 is open, the bled anode exhaust gas flows through bleed line 28. In this embodiment, the bled gas in the line 28 is mixed with the cathode exhaust gas on line 34 in a mixing junction 36.

In order to monitor the anode sub-system, various sensors are provided in the system 10. Particularly, a pressure sensor 40 measures the pressure at the inlet to the bleed valve 26, a pressure sensor 42 measures the pressure at the outlet of the bleed valve 26 and a temperature sensor 44 measures the temperature of the anode exhaust gas at the inlet to the bleed valve 26. Further, a flow meter 46 measures the flow of air being input to the cathode side of the fuel cell stack 12. In an alternate embodiment, the flow meter 46 can be eliminated and the flow rate of the compressor air can be derived based on various factors, such as a compressor map, compressor speed, inlet/outlet pressure, temperature, etc.

As discussed above, it is necessary to control the bleed of the anode exhaust gas to the cathode exhaust gas line 34 so that the concentration of hydrogen therein is maintained below a predetermined safe level. Typically, it is desirable to maintain the percentage of hydrogen in the mixed anode and cathode exhaust gas to be less than a few percent by volume. In order to perform this function, a controller 48 receives the temperature signal from the temperature sensor 44, the pressure signal from the pressure sensor 40, the pressure signal from the pressure sensor 42 and the flow signal from the flow meter 46. The controller 48 uses an algorithm that determines the concentration of hydrogen being bled from the bleed valve 26, and controls the compressor 30 and the bleed valve 26 to maintain the concentration of hydrogen in the combined exhaust gas below a predetermined level. The controller 48 also uses an algorithm to determine the concentration of nitrogen in the anode exhaust gas, and when an anode exhaust gas bleed is necessary to reduce the nitrogen concentration therein.

It has been discovered that there is a correlation between the leak rate or permeation rate of anode gases flowing through pinholes in the membranes from the anode side to the cathode side of fuel cells in a fuel cell stack and the standard deviation $\sigma_R^T$ of the voltage ranges of the fuel cells over a transient window of the fuel cell stack. The leak rate can be determined from tests as a fuel cell stack ages, and the standard deviation $\sigma_R^T$ is determined by the following equation:

$$\sigma_R^T = \sqrt{\frac{1}{N} \sum_{i=1}^{N} (\Delta V_i - \text{mean}(\Delta V))^2}$$

Where $V_i^j$ is the voltage of the $i^{th}$ cell for the $j^{th}$ sample in the transient window and $\Delta V_i = V_i^{max} - V_i^{min}$ is the range of voltages of the $i^{th}$ sample.

The standard deviation $\sigma_R^T$ of the voltage ranges of the fuel cells in the fuel cell stack 12 is a measure of how much the range changes over a defined period. If some cells have pinholes, they will exhibit larger fluctuations in voltages during power transients, and hence will provide an increase in the standard deviation $\sigma_R^T$.

Figure 3:
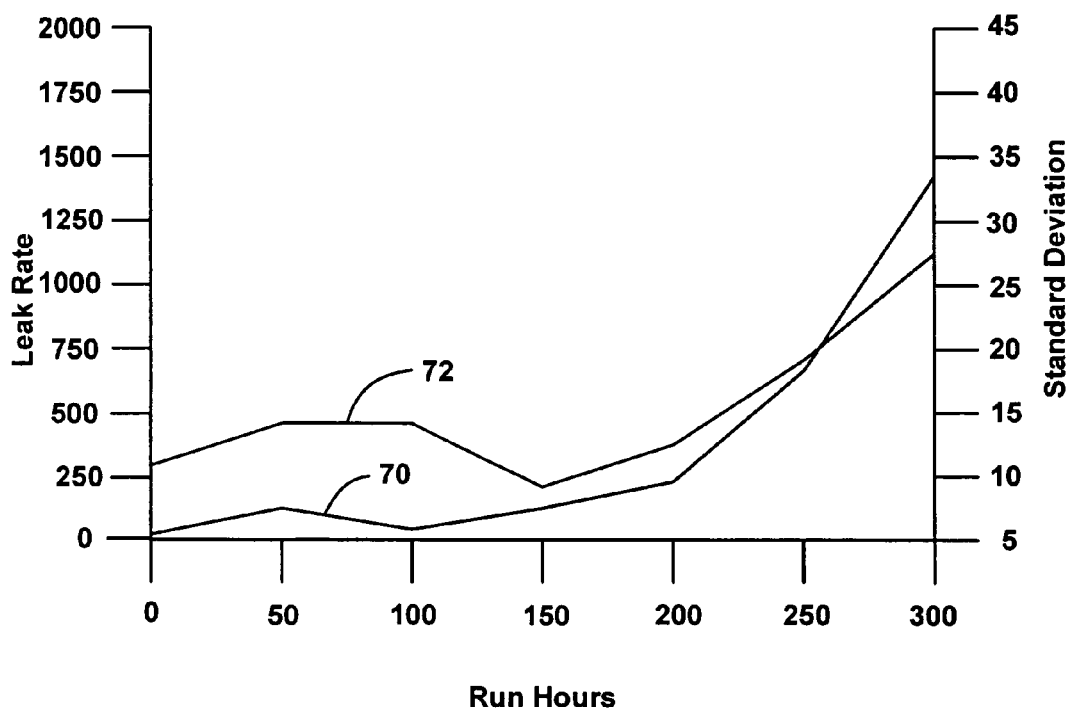
FIG. 3 is a graph with time on the horizontal axis, leak rate on the left vertical axis from the anode side to the cathode side of the fuel cell stack and standard deviation of the fuel cell voltages on the right vertical axis showing a correlation between cross-over leakage and cell voltage standard deviation for a fuel cell stack.

FIG. 3 is a graph with time on the horizontal axis, the leak rate on the left vertical axis and the standard deviation $\sigma_R^T$ on the right vertical axis showing the relationship between the leak rate and the standard deviation, where graph line 70 is for the leak rate and graph line 72 is for the standard deviation.

The leak rate will increase as the area of the pinholes increases, whether it be from the size of the pinholes or the number of the pinholes. As the leak rate increases over the life of the stack 12, the standard deviation $\sigma_R^T$ also increases.

In one embodiment, the controller 48 calculates the standard deviation $\sigma_R^T$ when the fuel cell stack 12 is exhibiting a lot of power transients or changes, such as during stop and go traffic, over a predetermined window, for example, 5 minutes. It is desirable to calculate the standard deviation $\sigma_R^T$ during transient windows, and not during steady state operation, because of the pressure drop across the MEAs and the membrane humidification cycle during the stack power transients.

Typically, the anode pressure is kept slightly higher than the cathode pressure so that during the anode exhaust gas bleed, the cathode exhaust gas does not enter the anode exhaust gas bleed line 28. For some stack designs, the pressure drop between the anode input and the anode output is relatively small when compared to the pressure drop between the cathode input and the cathode output, which increases linearly as the power level increases. Thus, the cathode inlet pressure will be greater at higher loads. Further, there may be instances where the cathode pressure is higher during power transients as a result of pressure fluctuations. Thus, during stack power transients, the cathode inlet receives higher pressures than the anode inlet. Therefore, the fuel cells that have pinholes may see fluctuations in voltage due to air moving into the anode, and thus an increase in the standard deviation $\sigma_R^T$. Further, relative humidity (RH) cycling causes the membranes to shrink and swell during transients. Also, testing has shown that leak rate diagnostics provides much higher leak rates when the stack is at 80% RH versus 110% RH.

Once the control algorithm has the anode to cathode leak rate, it can calculate the amount of nitrogen flowing from the anode side to the cathode side. Particularly, the amount of nitrogen flowing from the anode side to the cathode side will be a function of the leak rate times the pressure difference between the anode side and the cathode side times a proportional factor. Thus, an algorithm can be provided that continuously updates the flow of nitrogen from the anode side to the cathode side of the fuel cell stack during stack power transients, which will increase as the stack ages. Those skilled in the art will readily recognize how to use the amount of nitrogen flowing from the anode side to the cathode side to modify the model that determines the concentration of nitrogen in the anode side to determine when to perform the anode exhaust gas bleed. Various models are known to those skilled in the art to perform this function.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining when to bleed an anode exhaust gas from a fuel cell stack, said method comprising:
   determining the amount of nitrogen flowing from a cathode side of the fuel cell stack to an anode side of the fuel cell stack;
   determining the amount of nitrogen flowing from the anode side of the fuel cell stack to the cathode side of the fuel cell stack;
   determining the concentration of nitrogen or the concentration of hydrogen in the anode side of the fuel cell stack based on the nitrogen flow between the cathode and anode sides of the fuel cell stack; and
   bleeding the anode exhaust gas if the concentration of nitrogen in the anode side of the fuel cell stack goes above a predetermined value.

2. The method according to claim 1 wherein determining the amount of nitrogen flowing from the anode side of the fuel cell stack to the cathode side of the fuel cell stack includes determining a leak rate of nitrogen from the anode side to the cathode side by determining a standard deviation of voltage outputs of fuel cells in the fuel cell stack, and using the standard deviation as a model for determining the leak rate of nitrogen from the anode side to the cathode side of the fuel cell stack.

3. The method according to claim 2 wherein determining the standard deviation of the voltage outputs of the fuel cells includes determining the standard deviation of the voltage outputs of the fuel cells for a predetermined period of time only during power transients of the fuel cell stack.

4. The method according to claim 2 wherein determining the amount of nitrogen flowing from the anode side of the fuel cell stack to the cathode side of the fuel cell stack includes multiplying the leak rate of nitrogen from the anode side to the cathode side times the pressure difference between the anode side and the cathode side times a proportional factor.

5. The method according to claim 1 wherein the flow of nitrogen from the anode side to the cathode side of the fuel cell stack increases as the stack ages.

6. The method according to claim 1 wherein the flow of nitrogen from the anode side of the fuel cell stack to the cathode side of the fuel cell stack is a result of pin holes in a membrane in fuel cells in the fuel cell stack.

7. The method according to claim 1 further comprising mixing the bled anode exhaust gas with a cathode exhaust gas from the fuel cell stack.

8. A fuel cell system comprising:
   a fuel cell stack;
   a cathode exhaust gas line outputting a cathode exhaust gas from the fuel cell stack;
   an anode exhaust gas line outputting an anode exhaust gas from the fuel cell stack;
   a bleed valve coupled to the anode exhaust gas line for bleeding the anode exhaust gas;
   an anode bleed line coupled to the bleed valve that receives the anode exhaust gas when the bleed valve is opened; and
   a controller for determining when to open the bleed valve and bleed the anode exhaust gas from the anode exhaust gas line, said controller determining the amount of nitrogen flowing from a cathode side of the fuel cell stack to an anode side of the fuel cell stack, determining the amount of nitrogen flowing from the anode side of the fuel cell stack to the cathode side of the fuel cell stack, determining the concentration of nitrogen or hydrogen in the anode side of the fuel cell stack based on the nitrogen flow between the cathode and anode sides of the fuel cell stack, and bleeding the anode exhaust gas if the concentration of nitrogen in the anode side of the fuel cell stack goes above a predetermined value.

9. The system according to claim 8 wherein the controller determines the amount of nitrogen flowing from the anode side of the fuel cell stack to the cathode side of the fuel cell stack by determining a leak rate of nitrogen from the anode side to the cathode side by determining a standard deviation of voltage outputs of fuel cells in the fuel cell stack, and using the standard deviation as a model for determining the leak rate of nitrogen from the anode side to the cathode side of the fuel cell stack.

10. The system according to claim 9 wherein the controller determines the amount of nitrogen flowing from the anode side of the fuel cell stack to the cathode side of the fuel cell stack by multiplying the leak rate of nitrogen from the anode side to the cathode side times the pressure difference between the anode side and the cathode side times a proportional factor.

11. The system according to claim 9 wherein the controller determines the standard deviation of the voltage outputs of the fuel cells only during power transients of the fuel cell stack.

12. The system according to claim 8 wherein the anode bleed line is coupled to the cathode exhaust gas line so that the bled anode exhaust gas is mixed with the cathode exhaust gas.

13. The system according to claim 8 wherein the flow of nitrogen from the anode side of the fuel cell stack to the cathode side of the fuel cell stack increases as the stack ages as a result of the development of pin holes in membranes in the fuel cells of the stack.

14. The system according to claim 8 wherein the fuel cell system is on a vehicle.

15. A fuel cell system comprising:
a fuel cell stack;
a cathode exhaust gas line outputting a cathode exhaust gas from the fuel cell stack;
an anode exhaust gas line outputting an anode exhaust gas from the fuel cell stack;
a bleed valve coupled to the anode exhaust gas line and the cathode exhaust gas line for bleeding the anode exhaust gas into the cathode exhaust gas line; and
a controller for determining when to open the bleed valve and bleed the anode exhaust gas from the anode exhaust gas line, said controller determining the amount of nitrogen flowing from a cathode side of the fuel cell stack to an anode side of the fuel cell stack, said controller further determining the amount of nitrogen flowing from the anode side of the fuel cell stack to the cathode side of the fuel cell stack by determining a leak rate of nitrogen from the anode side to the cathode side by determining a standard deviation of voltage outputs of fuel cells in the fuel cell stack, and using the standard deviation as a model for determining the leak rate of nitrogen from the anode side to the cathode side of the fuel cell stack, said controller only determining the standard deviation of the voltages of the fuel cells during power transients of the fuel cell stack, said controller further determining the concentration of the nitrogen or hydrogen in the anode side of the fuel cell stack based upon the nitrogen flow between the cathode and anode sides of the fuel cell stack, and bleeding the anode exhaust gas if the concentration of nitrogen in the anode side of the fuel cell stack goes above a predetermined value.

16. The system according to claim 15 wherein the controller determines the amount of nitrogen flowing from the anode side of the fuel cell stack to the cathode side of the fuel cell stack by multiplying the leak rate of nitrogen from the anode side to the cathode side times the pressure difference between the anode side and the cathode side times a proportional factor.

17. The system according to claim 15 wherein the flow of nitrogen from the anode side of the fuel cell stack to the cathode side of the fuel cell stack increases as the stack ages as a result of the development of pin holes in membranes in the fuel cells of the stack.

18. The system according to claim 15 wherein the fuel cell system is on a vehicle.

* * * * *